F. A. NOLAN.

HEEL FASTENER.

APPLICATION FILED JUNE 11, 1913.

Reissued May 12, 1914. 13,728.

Witnesses:

H. L. Fischer.

G. R. Nicoll.

Inventor:

Francis A. Nolan, by: [illegible] Attorney.

UNITED STATES PATENT OFFICE.

FRANCIS A. NOLAN, OF ST. PAUL, MINNESOTA.

HEEL-FASTENER.

13,728. Specification of Reissued Letters Patent. Reissued May 12, 1914.

Original No. 1,004,897, dated October 3, 1911, Serial No. 608,178. Application for reissue filed June 11, 1913. Serial No. 773,135.

*To all whom it may concern:*

Be it known that I, FRANCIS A. NOLAN, a citizen of the United States, residing at St. Paul, in the county of Ramsey and State of Minnesota, have invented a new and useful Heel-Fastener, of which the following is a specification.

My invention relates to improvements in fasteners for detachable rubber heels and its object is to provide a heel fastener which can be readily fixed on a shoe to receive a suitable rubber heel and to hold it firmly in position while the shoe is in use and at the same time permit the ready removal of the heel for purposes of interchanging the heels or renewing them.

Means for attaching rubber heels have been used heretofore but the particular advantages which I secure in my device are marking means for centering the fasteners which give ease in locating the fasteners uniformly on the two shoes of a pair when attaching them to the shoes and in such a manner that the heels on a pair of shoes may when interchanged to secure uniform wear of the two heels, fit perfectly on the opposite shoe. The fasteners do not extend into the rear portion of the heels as in prior structures causing the heels in wearing, to break at the fastener and even to expose the fastener to wear, thus the heels can be worn longer. The strength of the rubber structure of the heel is preferably increased by webs extending between parts of the fastening flanges and this structure also causes forward or back pressure on the heel to clamp it more firmly onto the fastener flanges. Air recesses in the fastener and in the heel assist in maintaining the heel in connection with the fastener. The use of side flanges on the fastener without any rearwardly projecting flange in addition to increasing the amount of rubber in the rear portion of the heels where the most wear occurs, produces a more easily detachable connection with the heel, while giving a firm attachment during the wearing of the shoe.

Figure 1:
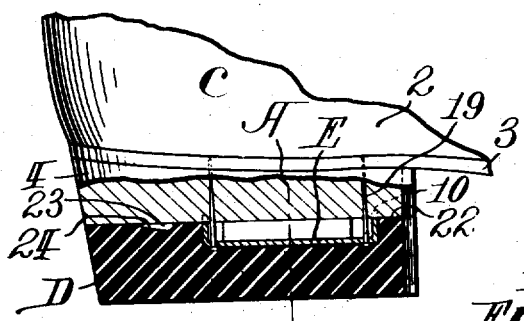
Figure 2:
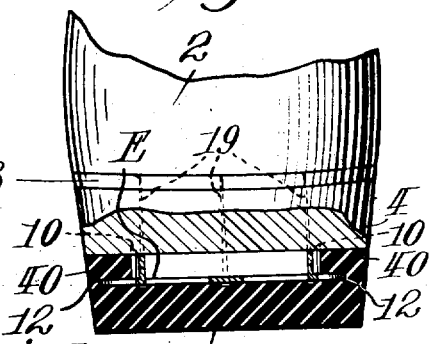
Figure 5:
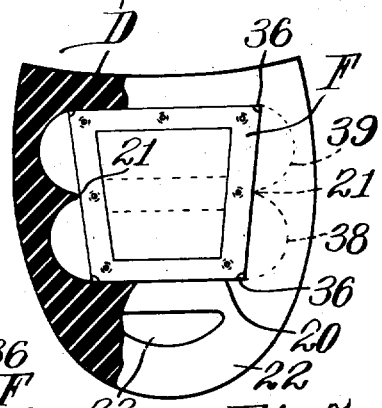
Figure 6:
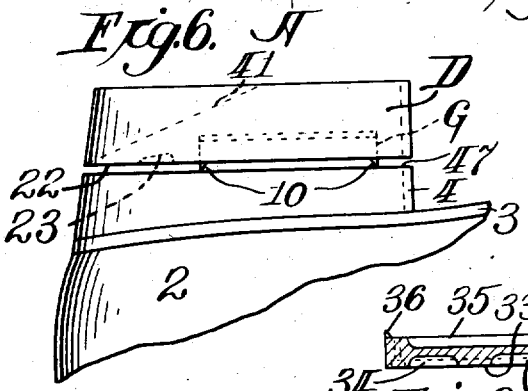
Figure 8:
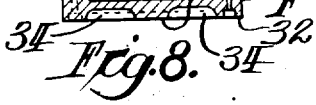
Figure 7:
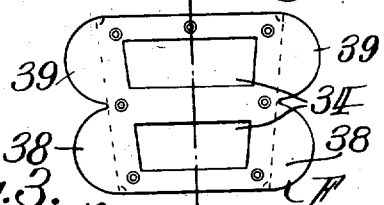
Figure 4:
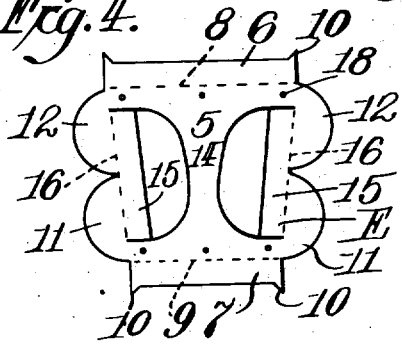
Figure 3:
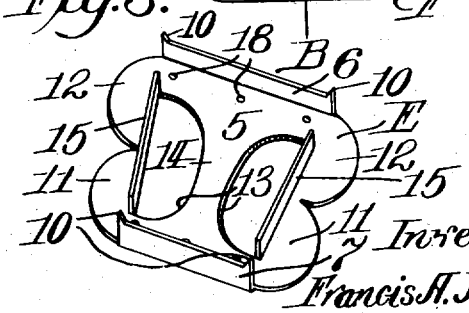

In the drawings with which I have illustrated my invention and which form part of my specification, Figure 1 is an elevation of the heel portion of a shoe with the heel partly in section; Fig. 2 is a section on the line A—A, Fig. 1; Fig. 3 is a perspective of the fastener; Fig. 4 is a bottom view of the fastener, geometrically developed, as when stamped from sheet metal; Fig. 5 is a top view of a heel with a free fastener, the heel being partly broken away to show the connection between the flanges of the fastener of an alternative construction and the material of the rubber heel; Fig. 6 shows a heel and unattached fastener applied to a shoe bottom in marking the correct position of the heel fastener; Fig. 7 is a bottom view of my alternative construction, and Fig. 8 is a section on the line B—B, Fig. 7.

In these drawings is shown a portion of a shoe C having a counter 2, sole 3 and a heel base 4 which may be of any desirable thickness or may be omitted entirely. A heel D formed of rubber or other suitable resilient material, is attached to the shoe C by a fastener E for which the heel D is suitably recessed at G.

The fastener E is in the form of a plate 5 punched from a flat piece of sheet metal as shown in Fig. 4, having forwardly and rearwardly extending rim portions 6 and 7 which are adapted to be bent upwardly at substantially right angles to the plane of the plate, along the lines 8 and 9 shown dotted in Fig. 4. At the corners of the upturned portions are acute points 10 which extend upward in the completed form of the device as shown in Fig. 3 and having one face oblique and one face normal to the surface of the heel base. From the lateral sides of the plate 5 extend flanges 11 and 12 respectively, at the forward and rearward ends of the sides. These flanges are formed with rounded sides and lie adjacent to each other with a V-shaped opening between them. Holes 13 are punched in the plate 5 leaving a bridge 14 connecting the forward and rear portions of the plate, and rim portions 15 are bent upward from the holes 13, along the lines 16 which are shown dotted in Fig. 4, and which approach each other toward the rear of the fastener E, giving the fastener an outline in general like that of a shoe heel. Holes 18 are made in the plate for nails, screws or other suitable means of attachment to the shoe. The rim portions 6, 7 and 15 are of substantially the same height above the plate and form a rim which rests against the heel base 4 of the shoe near the forward end of the heel D and on its middle lines with the bridge 14 downward. Nails 19 driven upward through the holes 18 and heel base 4, attach the fastener E firmly to the shoe. In this position the points 10 are fixed in the leather of the heel base 4 and serve to take the lateral strain from the nails 19. The nails 19 together with the points 10 are strong enough to resist the stresses of a rubber heel attached to the fastener E when used in walking.

The heel D is formed of rubber or other suitable elastic material and has the usual outer form of a rubber heel which, together with the heel base 4, make up a heel of the proper height for a shoe. In the top of the heel is an opening 20 fitted to the exterior of the rim formed by the rim portions 6, and 7 and 15 and fitting over them when the heel D is in its proper position on the shoe. Below the top of the heel the opening 20 is recessed laterally to receive the flanges 11 and 12, the rubber being left in the form of a web 21 to fill the V shaped opening between the flanges on each side of the fastener. The flanges 11 and 12 being of the same form on the two sides of the fastener, the recesses in the rubber heels D are of the same form on the two sides of the heel and the heel may be put on from either side equally well, which prevents the delay and possible injury to the heel from putting a heel on wrong onto an unsymmetrical fastener. In the top side 22 of the rubber heel immediately behind the fastener E is a recess or indentation 23 having a curved rear side 24 sloping downward and forward to the front of the indentation, furnishing a suction recess to assist in fixing the rear portion of the heel D to the heel base 4. An alternative construction F of my device is shown in Figs. 5, 7 and 8. The fastener F is formed by casting, drop forging, or other suitable means and consists of a continuous plate having upper and lower rims 31 and 32 and a bridge 33 connecting two sides of the lower rim 32 transversely of the fastener and forming air suction recesses 34 on the bottom or heel side of the fastener. A single suction recess 35 lies within the rim on the upper side of said plate. The rim 31 tapers slightly from front to rear of the fastener to conform to the shape of a shoe heel and carries at its four corners, sharp spurs 36 used as markers and engaging the heel base of the shoe when the fastener is fixed in position. The spurs have faces normal to the shoe base and serve to brace the fastener from movement thereon. Suitable nails attach the fastener F to the shoe C in a manner identical to the fastener E. On each of the lateral sides of the fastener F are flanges 38 and 39 in the plane of the fastener, and flush with the bottom of the rim 32. The flanges 38 and 39 have the same form as flanges 11 and 12 and fit into the same recesses in a rubber heel D. It will be readily understood that the purpose and action of the two forms of fastener are the same. The only differences of structure are such as are required by the method of forming the fastener. It will also be understood that the rims 15 appearing in Fig. 3 of the drawing and the lateral vertical faces between the front and back ends of the fastener of alternative construction produce the sides of the structure.

In fixing my fastener E or F on a heel base 4, the fastener is placed in the opening 20 in the top of the heel D with the points 10 or 36 extending upward as shown in Fig. 5. The heel and fastener are then placed on the prepared heel base 4 as shown in Fig. 6 with the points resting on the surface 47 of the heel base 4. The heel D is adjusted laterally and longitudinally of the shoe C until it is satisfactorily located when a light blow with a hammer or other suitable instrument on the heel, serves to indent the points into the base and mark its surface indicating exactly the proper position for the fastener to be fixed to hold the wheel in its required location. The fastener is removed from the heel and applied to the heel base with its points 10 or 36 in the marks made by them under the hammer blow. The nails 19 are then driven into the heel base 4 holding the fastener in position. A similar heel and fastener are applied to the mate of the first shoe by the same method. With similar heels similarly placed on similar heel bases, it is evident that the fasteners are similarly placed on the two shoes and as the fastener flanges on the two fasteners are similar, the heels may be removed at pleasure and exchanged, in this way equalizing the wear on the two sides of each heel, when as is commonly the case, the natural wear on a heel is unequally distributed. In removing a heel D from a fastener, the upper outside edge 40 of the heel near the heel base 4, is seized and pressed downwardly forcing the inner edge of the heel away from the fastener and out over the flange. By pressing on the two sides of the heel at the same time, the elasticity of the two sides of the heel may be utilized to free the heel D from both flanges at the same time. The similarity of the two flanges of the fastener allows the heel to be removed from either side first and to be put on with either side first. Thus no mistake can be made causing delay or injuring the rubber of the heel. The shallow depth of the fastener together with its position well forward on the heel and the absence of a rear flange on the fastener prevents the wear on the heel, shown by the dotted line 41 in Fig. 6, from reaching the fastener with a reasonable amount of wear on the heel. The longitudinal stresses in the heel in use pulling longitudinally of the edges 40 of the rubber heel, tend to hold these parts straight and close to the fastener thus preventing the heel from becoming loosened from the fastener.

In accordance with the patent statutes I have described the principles of operation of my invention together with the apparatus which I now consider to represent the best embodiment thereof but I desire to have it understood that the construction shown is only illustrative and that the invention can be carried out by other means and applied to uses other than those above set forth within the scope of the following claims.

Having described my invention, what I claim as new and desire to protect by Letters Patent is:—

1. In combination, a plate arranged to be attached to a shoe, having a rim portion to space it from the sole of said shoe, a pair of flange lugs on each side of said plate extending laterally in the plane of said plate, and a heel having recesses arranged to spring over said plate, flanges to engage with the same and a rib lying between the flanges of each pair to stiffen said heel.

2. In combination, an elastic heel having a central cavity in its top, a substantially vertical rear side extending downward into the material of the heel and recesses extending laterally from the bottom of said cavity toward the sides of said heel, vertical webs of said heel material intercepting said lateral recesses to strengthen said heel and a fastener arranged to be fixed to a shoe sole and fitting removably into said central cavity and divided lateral recesses to fix said heel to said shoe.

3. In combination, a plate arranged to be fixed centrally to a shoe heel having a pair of laterally adjacent engaging flanges integral with each side of said plate, and a rubber heel fitting over said plate and flanges to engage the same, said plate having a surface at its back end disposed substantially at right angles to the plane of said plate and said flanges being formed at the sides of said plate to permit solid rubber at the back of said heel and the flanges on each side of said plate having a space between them to receive a web of heel material, to stiffen said heel.

4. In combination, a plate arranged to be fastened on a shoe having front, back and side walls arranged to stand against the bottom face of a shoe, and laterally projecting side flanges on the lower edges of said side walls, and a resilient heel having a central cavity to receive the walls of said plate and projecting side recesses at the bottom of said cavity arranged to spring and fit into engagement over said flanges to assist in holding said heel on said shoe, said back wall having its entire outer surface in one plane substantially normal to said plate.

5. In combination, a plate arranged to be secured to a heel base and having upturned front, back and side rims and a pair of flanges on said plate projecting laterally from the lower portion of each of said side rims toward the sides of the heel base, and a resilient heel having a centrally disposed opening to receive said plate with its rims arranged to impinge against the shoe, said heel having lateral recesses below its top to receive and spring into engagement with said flanges.

6. In combination, a plate having an upturned front rim, back rim, and side rims, a pair of flanges on said plate projecting laterally from the lower portion of each of said side rims toward the sides of the heel base, and a resilient heel having a centrally disposed opening to receive said plate with its rims impinging against the heel base, said heel having lateral recesses below its top to receive said flanges, the material of said heel being left in the form of a web to fill the openings between said flanges on each side of said fastener.

7. In combination, a plate having rims upturned to rest upon a heel base of a shoe, spurs continuous with said rims and arranged to be embedded in said heel base in the fixed position of said fastener, having faces normal to said heel base and adapted to engage said base to prevent lateral movement of said fastener thereon, flanges on said plate projecting laterally from the low portion of said rims toward the sides of the heel base, and a resilient heel having recesses below its top to receive said fastener and spring into engagement with said flanges.

8. A fastener for resilient shoe heels, consisting of a plate arranged to be fastened on a heel base and having front, back and side walls and flanges projecting laterally from the lower edges of said side walls, said front and back walls having outer surfaces extending from top to bottom of the plate and standing at substantially right angles to the plane of the plate.

9. In combination, a plate arranged to be fastened on a shoe having front, back and side walls, and separated laterally projecting side flanges on the low edges of said side walls only, and a resilient heel having a central cavity to receive the walls of said plate and separated projecting side recesses at the bottom of said cavity arranged to spring and fit into engagement over said flanges to assist in holding said heel on said shoe.

10. A fastener for resilient shoe heels having upwardly extending sides arranged to rest upon the heel base of a shoe, the upper edges of said sides being provided with integral marking points extending beyond the outermost part of the fastener for positioning the fastener on the heel base.

In testimony whereof, I have signed my name to this specification, in the presence of two subscribing witnesses.

FRANCIS A. NOLAN.

Witnesses:

H. L. FISCHER,

F. G. BRADBURY.

Copies of this patent may be obtained for five cents each, by addressing the "Commissioner of Patents, Washington, D. C."